(12) United States Patent
Smith et al.

(10) Patent No.: US 9,304,904 B2
(45) Date of Patent: Apr. 5, 2016

(54) HIERARCHICAL FLASH TRANSLATION LAYER

(71) Applicant: Mangstor, Inc., Austin, TX (US)

(72) Inventors: Trevor Smith, Austin, TX (US); Ashwin Kamath, Cedar Park, TX (US); Ganesh Bodapatti, Austin, TX (US)

(73) Assignee: MANGSTOR, INC., Austin, TX (US)

( * ) Notice: Subject to any disclaimer, the term of this patent is extended or adjusted under 35 U.S.C. 154(b) by 170 days.

(21) Appl. No.: 14/067,015

(22) Filed: Oct. 30, 2013

(65) Prior Publication Data

US 2014/0122781 A1 May 1, 2014

Related U.S. Application Data

(60) Provisional application No. 61/719,986, filed on Oct. 30, 2012, provisional application No. 61/719,994, filed on Oct. 30, 2012, provisional application No. 61/720,000, filed on Oct. 30, 2012.

(51) Int. Cl.
*G06F 12/00* (2006.01)
*G06F 12/02* (2006.01)
*G06F 11/14* (2006.01)
*G06F 12/08* (2006.01)

(52) U.S. Cl.
CPC ........ *G06F 12/0246* (2013.01); *G06F 11/1441* (2013.01); *G06F 12/0866* (2013.01); *G06F 12/0804* (2013.01)

(58) Field of Classification Search
CPC .................. G06F 12/0246; G06F 12/0804
See application file for complete search history.

(56) References Cited

U.S. PATENT DOCUMENTS

2011/0072199 A1* 3/2011 Reiter et al. .................. 711/103

* cited by examiner

*Primary Examiner* — Zachary K Huson
(74) *Attorney, Agent, or Firm* — Andrews Kurth LLP; Sean S. Wooden

(57) ABSTRACT

A flash memory system comprises a flash device operable to store data in a plurality of physical blocks assigned to a plurality of sections, a plurality of Flash Translation Tables stored in a memory comprising a Forward Translation Table that maps a Section to a plurality of physical blocks, and a Sector Translation Table for each Section, the Sector Translation Table operable to map to a Physical Page Number identifying a particular Page, a Page Offset identifying a particular location within the Page, and a Section Local Block Table comprising Block Physical Addresses indexed by a Section Local Block Table ID.

15 Claims, 7 Drawing Sheets

//HIERARCHICAL FLASH TRANSLATION LAYER

RELATED APPLICATION

The present application claims the benefit of U.S. Provisional Patent Application Nos. 61/719,986; 61/719,994; and 61/720,000, all filed on Oct. 30, 2012 and incorporated herein by reference.

FIELD

The present disclosure relates to data storage devices, and in particular to an hierarchical Flash Translation Layer for flash memory devices.

BACKGROUND

Flash memory devices have been recognized as an attractive data storage option for mobile computers and smartphone devices because of their small size, light-weight, shock resistance, fast access speed, and low power consumption. It is anticipated that with further advances in flash memory technology, its popularity may rival or even outpace hard disks. However, due to the different construction and organization of flash memory as compared with a hard disk device, a special functionality commonly called Flash Translation Layer (FTL) is needed to manage the read and write operations of the flash memory to map the logical address to the physical address.

The host computer is accustomed to interfacing with a hard disk which is a block-based device that can be presented as a linear logically numbered set of sectors, and thus issues read and write commands specifying a logical sector address. On the other hand, flash memory devices are constructed of planes, blocks, and pages. Therefore, the Flash Translation Layer is operable to translate a sector access into a page or block access. During the address translation, the Flash Translation Layer typically looks up a address-mapping table. When performing an overwrite operation, the Flash Translation Layer may redirect the write operation to a physical address of an empty location that has been previously erased to improve speed performance, and later changes the next write address information in the mapping table.

One major consideration for the Flash Translation Layer software is memory access efficiency. Because flash memory has an erase-before-write requirement, and the unit size of memory to be erased is larger than the write unit size, performance degradation can be significant. A second major consideration for the Flash Translation Layer is the size of RAM (Random Access Memory) required to maintain its mapping tables and free memory space information. The flash memory device can endure only a fixed number of writes to a memory element before it loses the ability to retain information. The flash memory device control mechanism thus also manages wear-leveling, which uses extra writes and garbage collection algorithms to control and even out the number of writes on the memory elements. The total cost for the flash memory device is tied to its RAM requirements.

SUMMARY

A method for translating a logical address to a physical address in a flash memory, comprises receiving a Logical Sector Number as the location for a data access operation, using the Logical Sector Number to obtain a {Section ID, Section Relative Sector ID} tuple, using the Section ID to identify and access one of a plurality of Sector Translation Tables, accessing the identified Sector Translation Table using Section Relative Sector ID as an index to access a {Section Local Block Table ID, Physical Page Number, Page Offset} tuple, using the Section Local Block Table ID to identify a physical block in the flash memory that is represented by a {Flash Device ID, DIE, Logical Unit, Block Number} tuple, and accessing a particular location in the physical block of the flash memory identified by the {Flash Device ID, DIE, Logical Unit, Block Number, Physical Page Number, Page Offset} tuple.

A method for an hierarchical flash translation layer for a flash device, comprises forming a table that maps a fixed number of Physical Blocks in the flash device to Section Numbers, and forming a Sector Translation Table for each Section Number, the Sector Translation Table operable to map to a Physical Page Number identifying a particular Page, a Page Offset identifying a particular location within the Page, and a Section Local Block Table comprising Block Physical Addresses indexed by a Section Local Block Table ID.

A method for booting a flash memory device comprises determining a Section ID for a boot sector, loading a Section Local Block Table for the section identified by the Section ID, the Section Local Block Table containing the address of a plurality of blocks, reading data in the blocks identified in the Section Local Block Table to initialize a Sector Translation Table for the section identified by the Section ID, determining a Section Relative Sector ID, accessing the identified Sector Translation Table using Section Relative Sector ID as an index to access a {Section Local Block Table ID, Physical Page Number, Page Offset} tuple, using the Section Local Block Table ID to identify a physical block in the flash memory that is represented by a {Flash Device ID, DIE, Logical Unit, Block Number} tuple, and accessing a particular location in the physical block of the flash memory containing boot records identified by the {Flash Device ID, DIE, Logical Unit, Block Number, Physical Page Number, Page Offset} tuple.

A flash memory system comprises a flash device operable to store data in a plurality of physical blocks assigned to a plurality of sections, hierarchical Flash Translation Tables stored in a memory, and a plurality of DSP core processors operable to process, in parallel, a plurality of Flash Translation Table lookup operations each associated with a section of the flash device.

A flash memory system comprises a flash device operable to store data in a plurality of physical blocks assigned to a plurality of sections, a plurality of Flash Translation Tables stored in a memory comprising a Forward Translation Table that maps a Section to a plurality of physical blocks, and a Sector Translation Table for each Section, the Sector Translation Table operable to map to a Physical Page Number identifying a particular Page, a Page Offset identifying a particular location within the Page, and a Section Local Block Table comprising Block Physical Addresses indexed by a Section Local Block Table ID.

DETAILED DESCRIPTION

Figure 1:
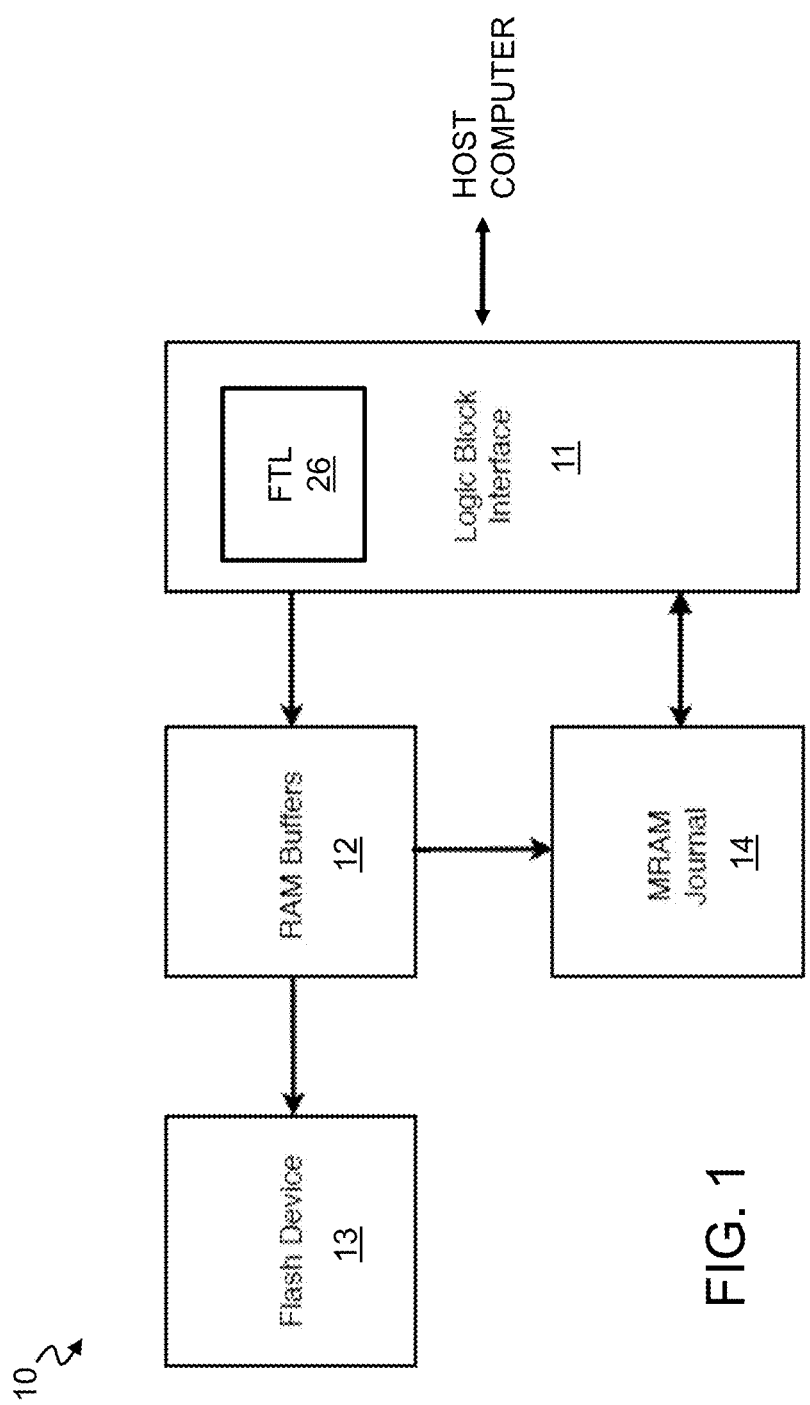
FIG. 1 is a simplified block diagram of an exemplary embodiment of a flash memory device according to the present disclosure.

FIG. 1 is a simplified block diagram of an exemplary embodiment of a flash memory 10 according to the present disclosure. The flash memory 10 includes logic block interface 11 that serves as an interface to a host computer or host device (not explicitly shown). The logic block interface 11 may include a Flash Translation Layer (FTL) module 26 to provide a translation between the logical block addresses used in the read and write commands issued by the host computer, and the physical addresses in the flash device 13. Host computers typically access hard disk drives that are logically organized into sectors. RAM buffers 12 are communicatively coupled between the logic block interface 11 and the flash device 13. The RAM buffers 12 are used to buffer or temporarily hold data to be written to the flash device 16 as well as the translated physical address of the location to be written to. A MRAM (Magnetic Random Access Memory) journal 14 is further communicatively coupled with the logical block interface 11 and the RAM buffers 12. MRAM technology is a non-volatile memory technology that does not rely on a power source to retain the stored data, and can maintain its data nearly permanently.

Figure 2:
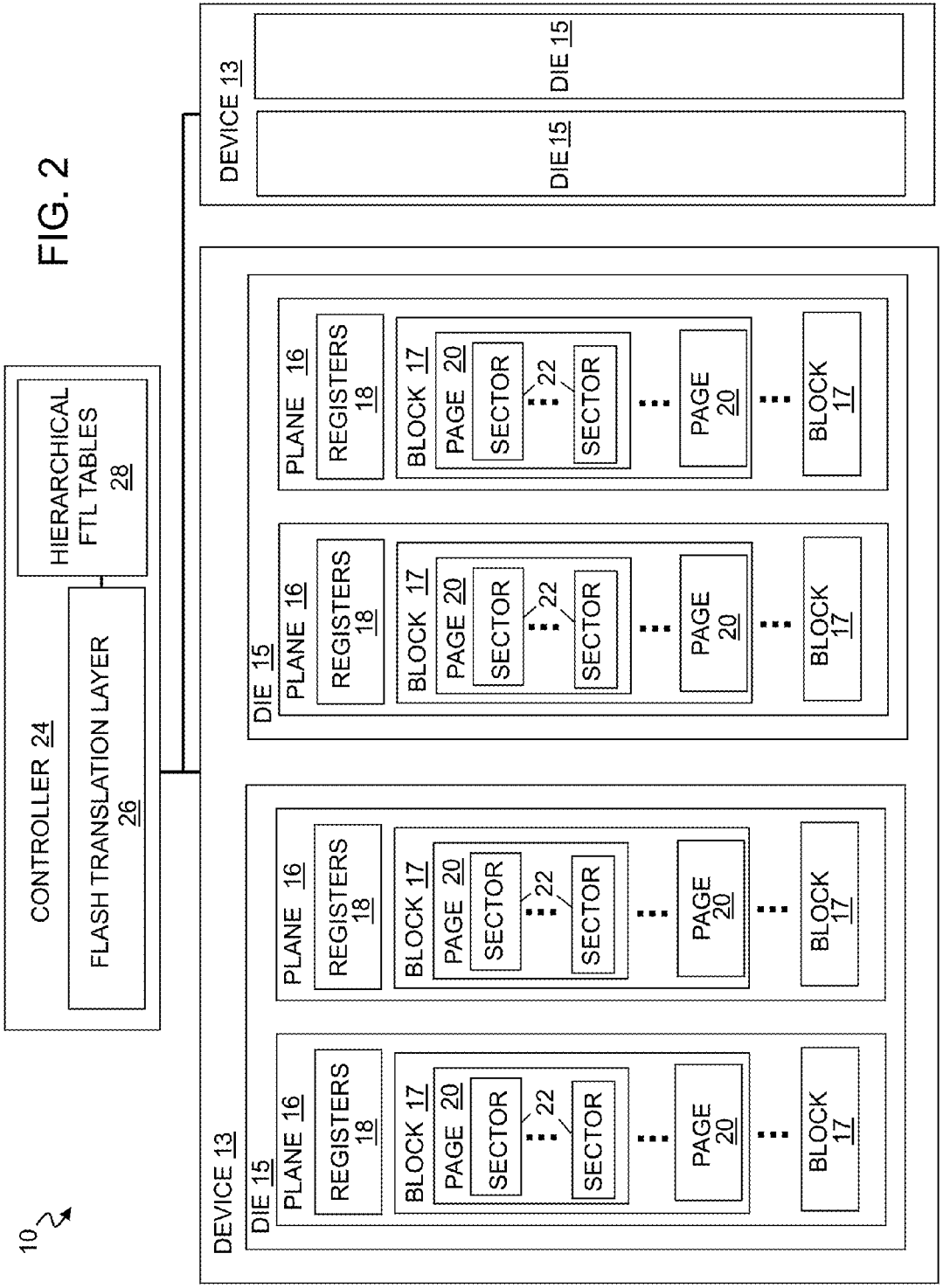
FIG. 2 is a more detailed block diagram of an exemplary embodiment of a flash memory device according to the present disclosure.

FIG. 2 is a more detailed block diagram of an exemplary embodiment of a flash memory 10 according to the present disclosure. A flash memory 10 typically includes multiple flash devices 13, which may in turn include multiple dies 15. Each die 15 is divided into multiple logical units (not shown explicitly for the sake of clarity). Each logical unit is in turn divided into multiple planes 16, which further in turn are divided into multiple blocks 17. Each plane 16 has one or more registers 18 (such as page registers and cache registers) that hold data for flash array read/write operations. A block 17 is further divided into multiple pages 20. Because access of hard disk drive devices are sector-based, the flash device can be similarly organized by dividing a page into one or more flash sectors 22. So the hierarchical units are device-die-LUN-plane-block-page-sector.

An array of flash devices 13 that is presented as a single storage device has a sector organization to plug into existing storage stacks seamlessly. There are typically 128 or 256 pages per block. In general, pages within a block must be written sequentially but can be read in any order.

In a flash memory device, a write operation has to be preceded by an erase operation, which takes much longer than the write operation itself Further, the smallest addressable unit for read and write operations is a page, but the smallest erasable unit is a block. This means that to even write a single byte of data into a flash memory requires the erase and restoration of a block of data.

A controller 24 is coupled to or in communication with the flash device 13. The controller 24 includes an hierarchical Flash Translation Layer (FTL) 26 that is operable to store mapping data in a plurality of hierarchical Flash Translation Layer tables 28 stored in RAM, and access the data stored in the tables to manage the read and write operations of the flash memory device. The Flash Translation Layer 26 is used to assist with translation from a logical address used by a host computer to a physical address in the flash memory.

The Flash Translation Layer 26 utilizes hierarchically-organized translation tables to reduce the amount of RAM needed to store the translation data. By organizing the Flash Translation Layer tables hierarchically, the number of bits used to store translation information is greatly reduced.

When a read or write command is issued, it may include a logical sector address specifying the location of the read or write operation. The logical sector address or Logical Sector Number (LSN) may be used to determine the Section Number or SID. The SID may be determined by dividing the Logical Sector Number by the total number of sections in the flash device, or SID=LSN÷number of sections (or SID=LSN÷No. Section). Further, the Logical Sector Number may also be used to determine the Section Relative Sector ID or SRSID by using a MODULO operation: LSN MODULO the number of sections (or SID=LSN MOD No. Section). Thus, using the logical sector address, the tuple {SID, SRSID} may be determined.

Figure 3:
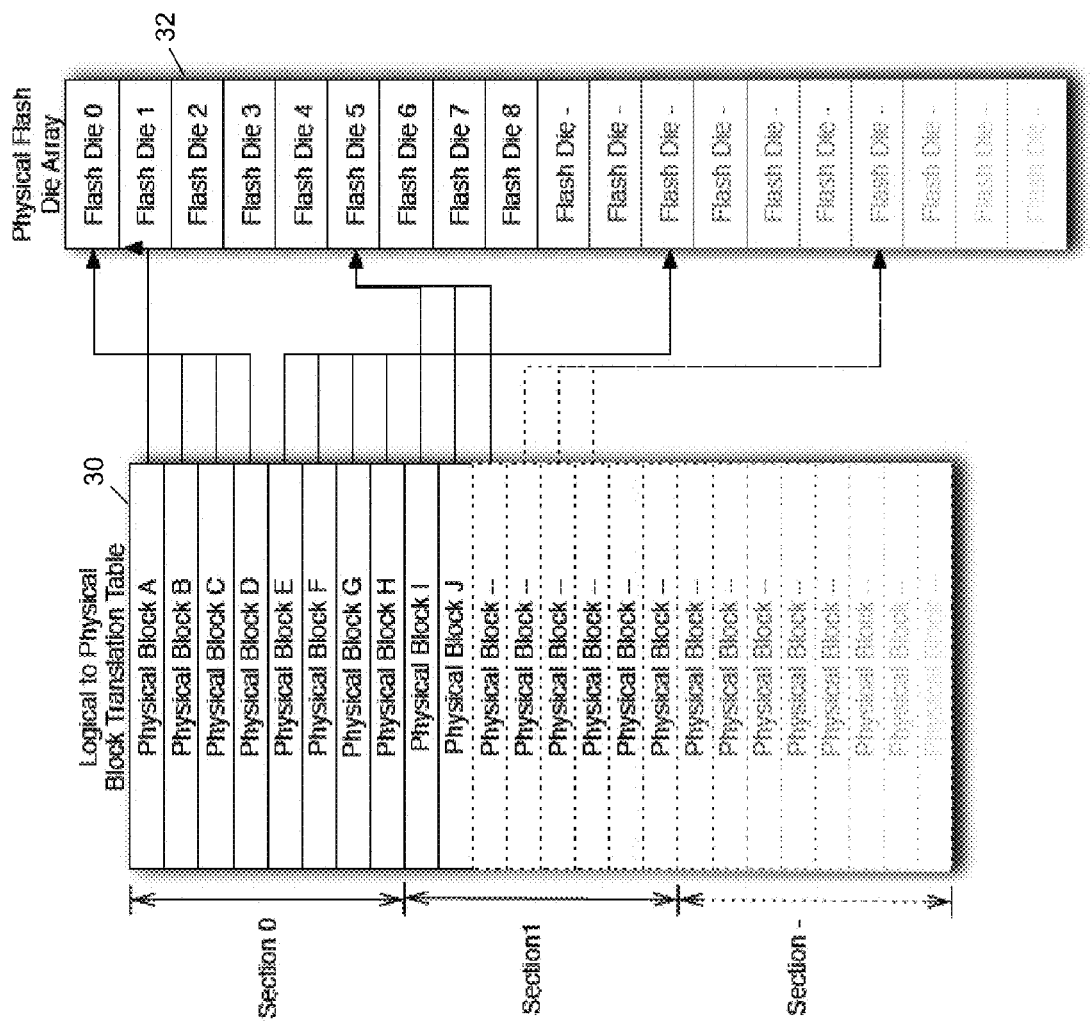
FIG. 3 is a simplified block diagram of an exemplary embodiment of a section to physical flash block translation table according to the present disclosure.

FIG. 3 is a simplified block diagram of an exemplary embodiment of a Forward Translation Table 30 according to the present disclosure. The Forward Translation Table 30 provides a logical section to physical block translation. The physical blocks from a plurality of dies of a flash device are mapped to a number of logical sections and vice versa. In other words, each section includes a fixed number of physical blocks. Therefore as shown in FIG. 3, physical blocks A-I may be assigned to Section Number 0 and physical blocks J-P may be assigned to Section Number 1, for example. The Section Number or SID determined by using the Logical Sector Number identifies a set of physical blocks on the flash memory media array.

Figure 4:
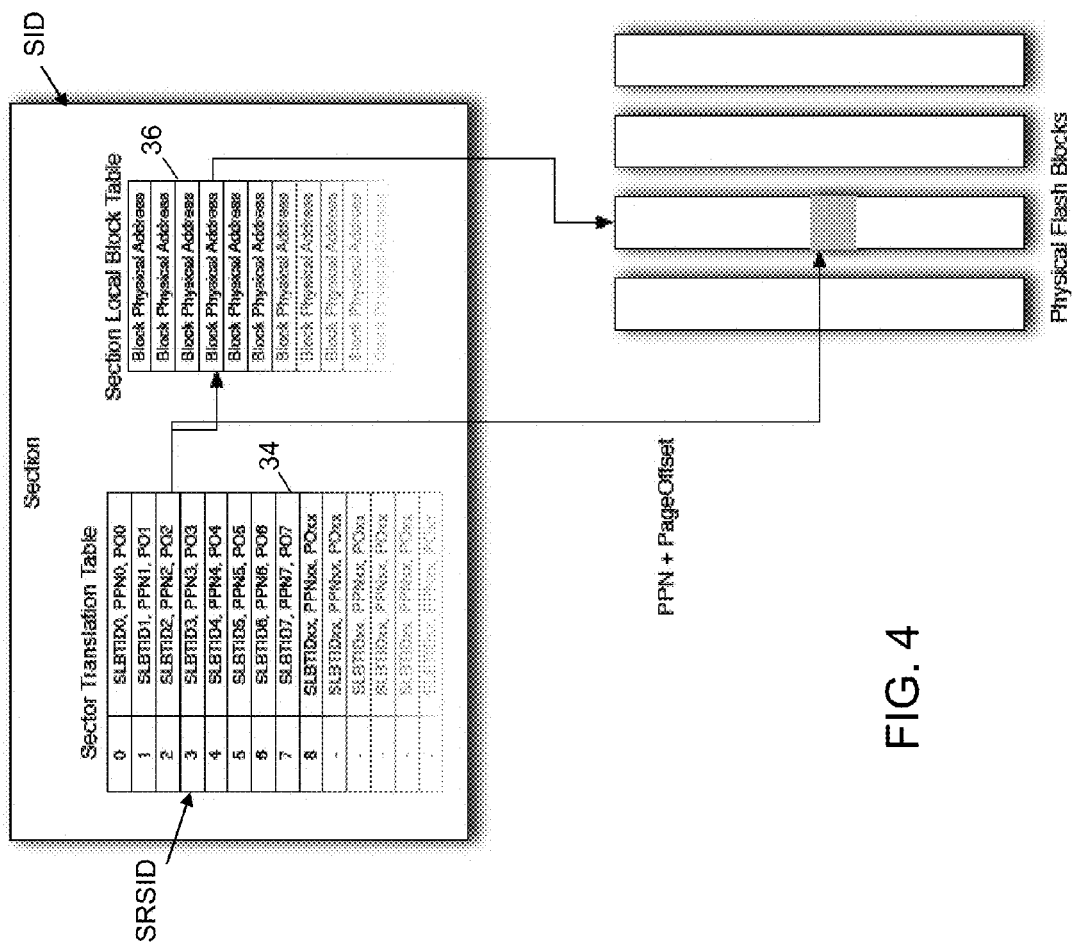
FIG. 4 is a simplified block diagram of an exemplary embodiment of a sector translation table mapped to a section local block table according to the present disclosure.

FIG. 4 is a simplified block diagram of an exemplary embodiment of a Sector Translation Table 34 mapped to a Section Local Block Table 36 according to the present disclosure. For each section identified by the SID, the SID is the table index that identifies a particular Sector Translation Table 34, and each Sector Translation Table 34 may be indexed by the SRSID into its entries. Each entry of the Sector Translation Table 34 may contain the tuple {Section Local Block Table ID, Physical Page Number, Page Offset} or {SLBTID, PPN, PO}. Using this tuple, a specific Block Physical Address in the Section Local Block Table 36 can be identified by SLBTID, and a specific location within the physical block is further identified by Physical Page Number+Page Offset for data operations.

The Section Local Block Table ID or SLBTID may be used as an index into the Section Local Block Table 36 to obtain the physical block information, which can also be expressed as {Flash Device ID, Die, Logical Unit, Block Number} or {FDID, DIE, LUN, BN}. This result is the final combined tuple of {Flash Device ID, Die, Logical Unit, Block Number, Physical Page Number, Page Offset} or {FDID, DIE, LUN, BN, PPN, PO}, which is the translated address that can be used to execute the read or write command.

Thus, the Section State also consists of a Sector Translation Table 34 that maps the SRSID into a SLBT and Physical Page Number of the page that contains the Logical Sector data. The Section State consists of a set of Section Local Blocks organized in the Section Local Block Table 36. The sum of all Section Relative Blocks is more than the sum of all blocks required to represent the externally visible size of the disk, the difference being the overhead blocks used to account for the fragmentation that occurs in the mapping of logical blocks to physical blocks. The Section State also includes additional state variables that assist in wear leveling and write operations.

Accordingly, a Logical Sector Address may be translated to the Physical Block Address may be performed by the following steps:

1. Receive a Logical Sector Address or Logical Sector Number as the location for the data operation;
2. Use the Logical Sector Number to obtain the {SID, SRSID} tuple;
3. Use the SID to access a specific Sector Translation Table;
4. Use the Sector Translation Table and SRSID to obtain the {SLBTID, PPN, PO} tuple;
5. Use the SRSID and SLBT to obtain the physical block that translates to the {FID, DIE, LUN, BN} tuple;
6. Use {FDID, DIE, LUN, BN, PPN, PO} Tuple to Access the Flash Device.

The Section State also includes NextWritePPN, which is the Physical Page for the next write operation; NextWriteOffset, which is the Page Offset where the next write operation will occur; NextWriteSRBID (NWSRBID), which is the Section Local Block ID where the next write operation will occur; and NextWriteSRBIDCount (NWSRBIDCount), which is the number of Block IDs for the next write operation. When NWSRBIDCount writes accumulate, the writes are issued to the above quantities and they are incremented. Other processes coordinate with this write to ensure that when the blocks identified by NWSRBID and NWSRBIDCount are full, a different set of blocks in the SLBT get deallocated and recycled. Finally, the Sector Translation Table is updated with the new information.

Figure 5:
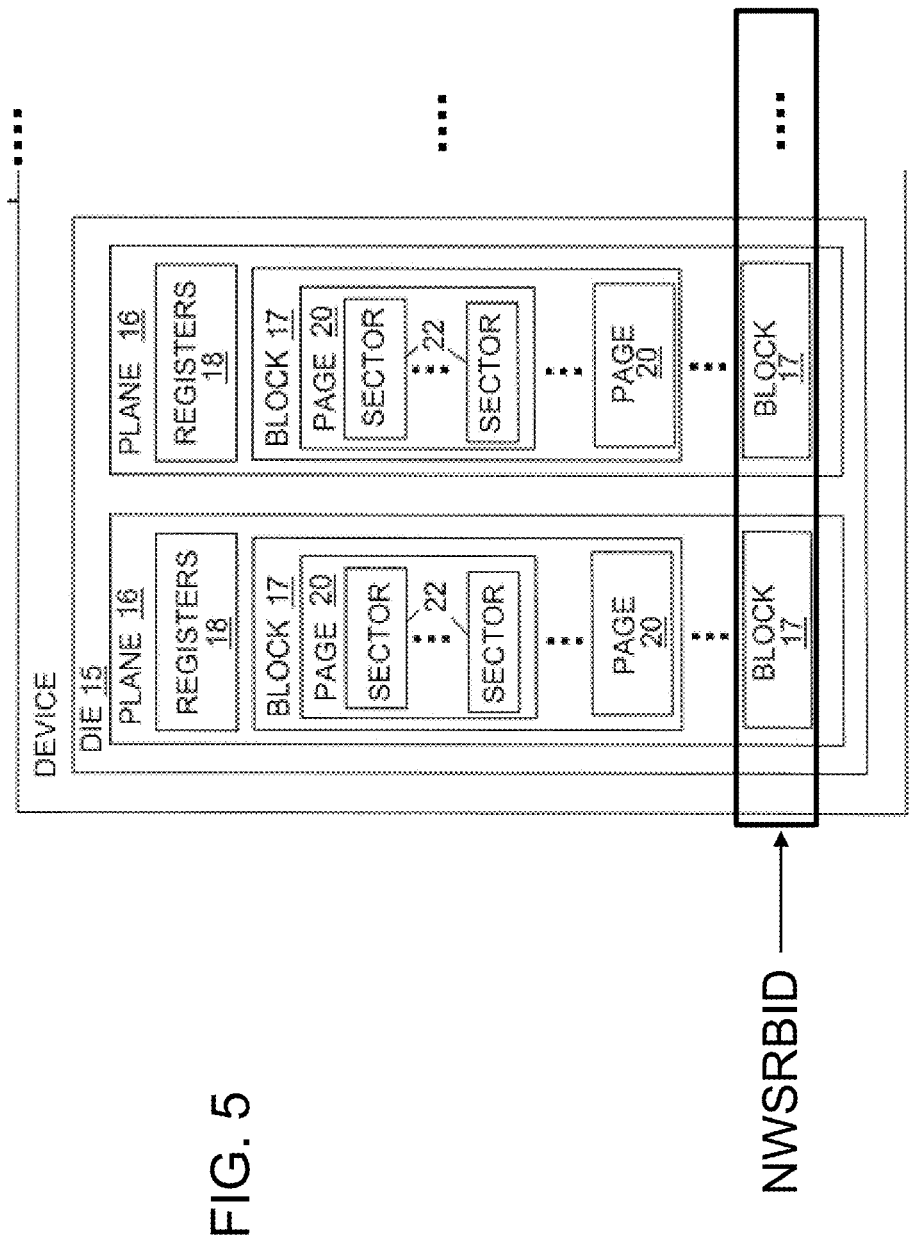
FIG. 5 is a simplified block diagram illustrating an optimized write process according to the present disclosure.

Referring to FIG. 5, a more efficient write method has been contemplated. Flash devices are more efficient when writing multiple planes in one transaction. By setting NWSRBIDCount to a multiple of the plane count, data can be striped across the blocks identified by NWSRBID. A block allocation strategy is used to allocate NWSRBIDCount blocks in the same flash die to facilitate these multi-plane operations. While FIG. 5 shows only two planes are being processed by the multi-plane next write operation, the concept can be extended to any number of planes. The number of planes in the operation may be tuned to be very high to achieve high efficiency.

Figure 6:
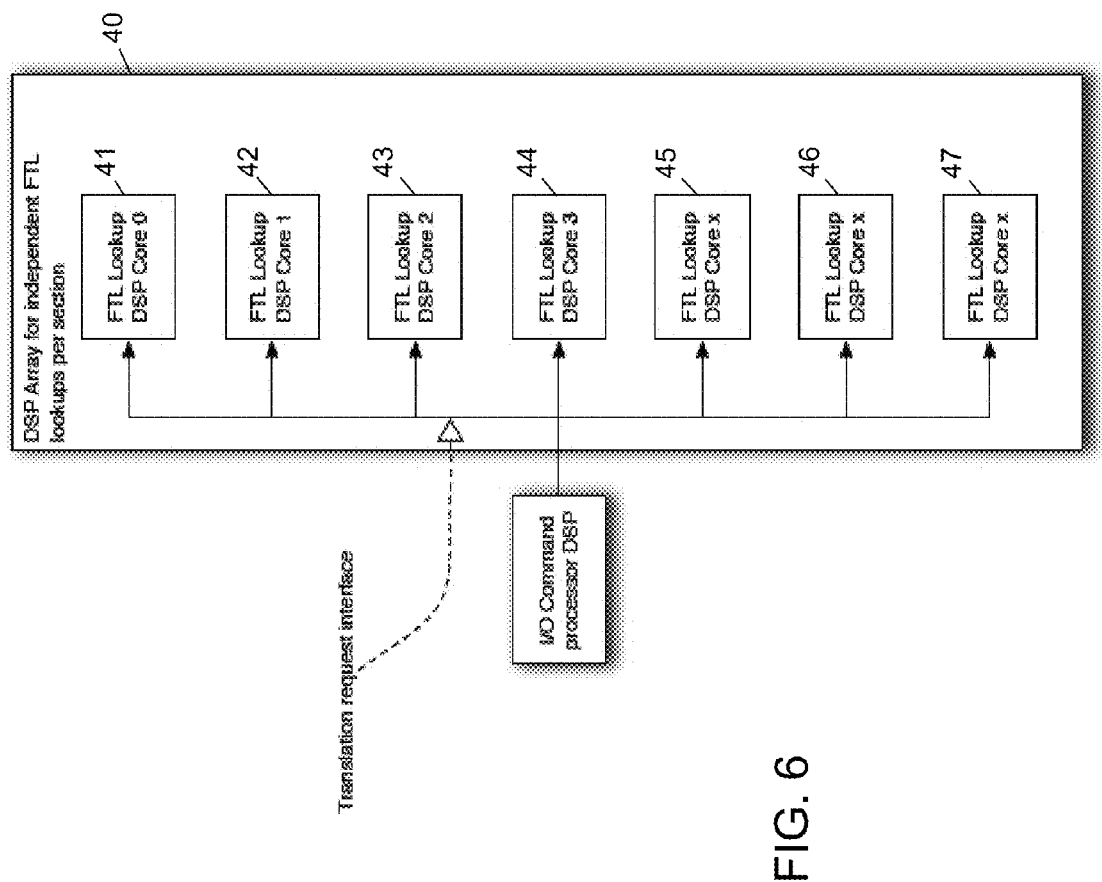
FIG. 6 is a simplified block diagram of an exemplary embodiment of a digital signal processor (DSP) array configuration according to the present disclosure.

FIG. 6 is a simplified block diagram of an exemplary embodiment of a digital signal processor (DSP) array configuration according to the present disclosure. The flash memory of the present invention employs a multi-core DSP (digital signal processing) array 40 that is operable to perform FTL look-ups. Each DSP core 41-47 is operable to perform these FTL functions for a particular section of the flash memory. In other words, a section's read and write operations are scheduled and carried out in its own assigned DSP core. Accordingly, efficient parallel processing is employed to simultaneously address read and write operations of multiple sections of the flash memory.

Data redundancy is also implemented at the section level to allow distributed processing of data redundancy.

Figure 7:
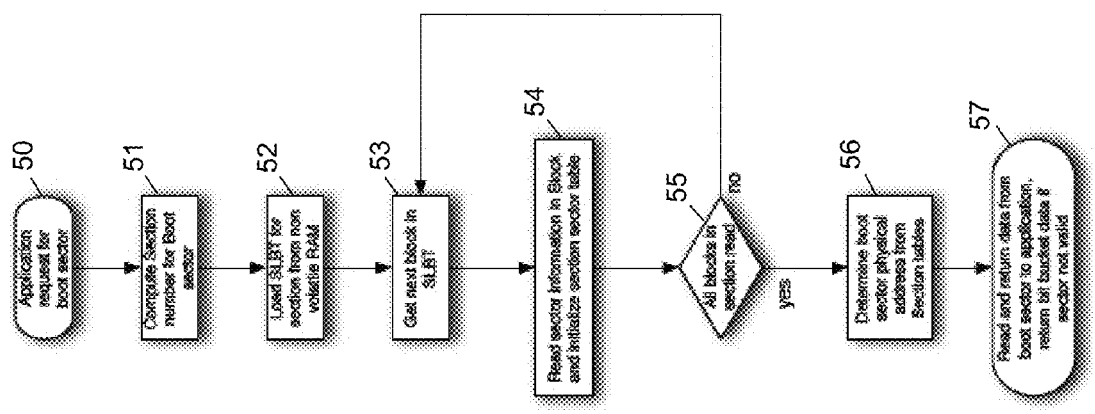
FIG. 7 is a simplified flowchart of an exemplary embodiment of a device boot procedure according to the present disclosure.

FIG. 7 is a simplified flowchart of an exemplary embodiment of a device boot procedure according to the present disclosure. Conventionally, the entire flash memory device has to be read in order to build or reconstruct the FTL tables upon power-up. The procedure shown in FIG. 7 requires only reading the physical blocks of a particular section of flash memory that correspond to the boot sector at boot time. In block 50, an application requests for the boot sector. In block 51, the section number or SID for the boot sector is determined. In block 52, the Section Local Block Table or SLBT for the section identified by the SID is loaded from a non-volatile RAM such as a MRAM (Magnetic Random Access Memory). In block 53, the next block in the SLBT is loaded. In block 54, the sector information in the block is read and the Sector Translation Table and the Section Local Block Table for the section are initialized and built. A determination is made in block 55 whether all the blocks in the section has been read. If not all the blocks have been read, then the process returns to block 53 to read the next block until all blocks have been read. If all the blocks have been read, then the boot sector's physical address is determined from the section's Sector Translation Table and the Section Local Block Table in block 56. Data from the boot sector are read and provided to the application in block 57. Else if the sector is not valid, then the bit bucket data is returned to the application instead.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A method for translating a logical address to a physical address in a flash memory, comprising:
    receiving a Logical Sector Number as the location for a data access operation;
    using the Logical Sector Number to obtain a {Section ID, Section Relative Sector ID} tuple;
    using the Section ID to identify and access one of a plurality of Sector Translation Tables;
    accessing the identified Sector Translation Table using Section Relative Sector ID as an index to access a {Section Local Block Table ID, Physical Page Number, Page Offset} tuple;
    using the Section Local Block Table ID to identify a physical block in the flash memory that is represented by a {Flash Device ID, DIE, Logical Unit, Block Number} tuple; and
    accessing a particular location in the physical block of the flash memory identified by the {Flash Device ID, DIE, Logical Unit, Block Number, Physical Page Number, Page Offset} tuple.

2. The method of claim 1, wherein using the Logical Sector Number to obtain a {Section ID, Section Relative Sector ID} tuple comprises determining {Section ID=Logical Sector Number÷Number of Sections, Section Relative Sector ID=Logical Sector Number MOD Number of Sections}.

3. The method of claim 1, further comprising:
    identifying a plurality of blocks in a die in the flash memory with a NextWrite Section Relative Block ID (NWSRBID); and
    writing data to the plurality of blocks identified by NWSRBID in a single write operation.

4. A method for booting a flash memory device comprising:
    determining a Section ID for a boot sector;
    loading a Section Local Block Table for the section identified by the Section ID, the Section Local Block Table containing the address of a plurality of blocks;

reading data in the blocks identified in the Section Local Block Table to initialize a Sector Translation Table for the section identified by the Section ID;

determining a Section Relative Sector ID;

accessing the identified Sector Translation Table using Section Relative Sector ID as an index to access a {Section Local Block Table ID, Physical Page Number, Page Offset} tuple;

using the Section Local Block Table ID to identify a physical block in the flash memory that is represented by a {Flash Device ID, DIE, Logical Unit, Block Number} tuple; and accessing a particular location in the physical block of the flash memory containing boot records identified by the {Flash Device ID, DIE, Logical Unit, Block Number, Physical Page Number, Page Offset} tuple.

5. A flash memory system addressable by a logical sector number (LSN), comprising:

a flash storage device comprising a plurality of physical blocks operable to store data;

a controller;

at least one non-transitory, computer-readable medium operable for storing one or more flash translation tables (FTT) and further comprising computer-executable instructions that, when executed by the controller, cause the flash memory system to perform FTT operations comprising the procedures:

(a) receiving a logical sector number (LSN) identifying a location for a data access operation;

(b) determining a {Section ID, Section Relative Sector ID} tuple based on the LSN;

(c) based on the {Section ID, Section Relative Sector ID} tuple, accessing an entry in one of a plurality of Sector Translation Tables (STT) to obtain a {Section Local Block Table ID, Physical Page Number, Page Offset} tuple;

(d) based on the Section Local Block Table ID, accessing an entry in a Section Local Block Table (SLBT) to obtain a {Flash Device ID, DIE, Logical Unit, Block Number} tuple representing a physical block in the flash storage device; and (e) determining a location in the physical block of the flash storage device corresponding to the LSN based on the tuples obtained from the accessed entries.

6. The flash memory system of claim 5, wherein the location in the physical block of the flash storage device corresponding to the LSN is identified by the tuple comprising {Flash Device ID, DIE, Logical Unit, Block Number, Physical Page Number, Page Offset}.

7. The flash memory system of claim 5, wherein the at least one non-transitory, computer-readable medium further comprises computer-executable instructions that, when executed by the controller, cause the flash memory system to: (f) perform the data access operation on at least the determined location in the physical block of the flash storage device.

8. The flash memory system of claim 5, wherein the physical blocks of the flash memory device are organized into a plurality of sections, each section being associated with: (1) a particular Section ID; (2) a particular one of the plurality of Sector Translation Tables; and (3) a Section Local Block Table.

9. The flash memory system of claim 8, wherein the controller comprises:

an array of section processors, each configurable to execute a portion of the computer-executable instructions to perform procedures (c), (d), and (e) pertaining to a particular section of the flash storage device; and a command processor configurable to execute a portion of the computer-executable instructions to perform procedures (a) and (b), and to issue commands to respective ones of the section processors based on determined Section IDs.

10. The flash memory system of claim 8, wherein the controller is configured to process a plurality of FTT operations in parallel, each FTT operation associated with a section of the flash storage device.

11. The flash memory system of claim 8, wherein the at least one non-transitory, computer-readable medium further comprises computer-executable instructions that, when executed by the controller, cause the flash memory system to:

(g) determine a NextWrite Section Relative Block ID (NWSRBID) based on the Section ID;

(h) determine a plurality of blocks in the flash storage device based on the NWRBID; and (j) write data to the plurality of blocks in a single write operation.

12. The flash memory system of claim 5, wherein procedure (b) comprises the following operations: {Section ID=LSN÷Number of Sections, Section Relative Sector ID=Logical Sector Number MOD Number of Sections}.

13. A flash memory system, comprising:

a flash storage device configured in a plurality of sections, each section comprising a plurality of physical blocks;

a controller;

at least one non-transitory, computer-readable medium operable for storing one or more flash translation tables (FTT) and further comprising computer-executable instructions that, when executed by the controller, cause the flash memory system to perform procedures comprising:

(a) determining a Section ID and a Section Relative Sector ID corresponding to a boot sector of the flash memory system;

(b) loading a Section Local Block Table (SLBT) associated with the Section ID, the SLBT comprising the addresses of a plurality of physical blocks;

(c) reading data in the physical blocks identified in the SLBT;

(d) based on the read data, initializing a Sector Translation Table (STT) associated with the Section ID;

(d) accessing an entry, corresponding to the Section Relative Sector ID, in the initialized STT to obtain a {Section Local Block Table ID, Physical Page Number, Page Offset} tuple;

(f) accessing an entry, corresponding to the Section Local Block Table ID, in the SLBT to obtain a {Flash Device ID, DIE, Logical Unit, Block Number} tuple representing a physical block in the flash storage device;

(g) determining a location in the physical block of the flash storage device corresponding to the boot sector of the flash memory system based on the tuples obtained from the accessed entries.

14. The flash memory system of claim 5, wherein the location in the physical block of the flash storage device corresponding to the boot sector is identified by the tuple comprising {Flash Device ID, DIE, Logical Unit, Block Number, Physical Page Number, Page Offset}.

15. The flash memory system of claim 5, wherein the at least one non-transitory, computer-readable medium further comprises computer-executable instructions that, when executed by the controller, cause the flash memory system to:

(h) access the determined location in the physical block of the flash storage device.

\* \* \* \* \*